W. M. FULTON.
HEATING SYSTEM AND SYSTEM FOR TEMPERATURE REGULATION.
APPLICATION FILED APR. 21, 1909.
998,767.
Patented July 25, 1911.
2 SHEETS—SHEET 1.
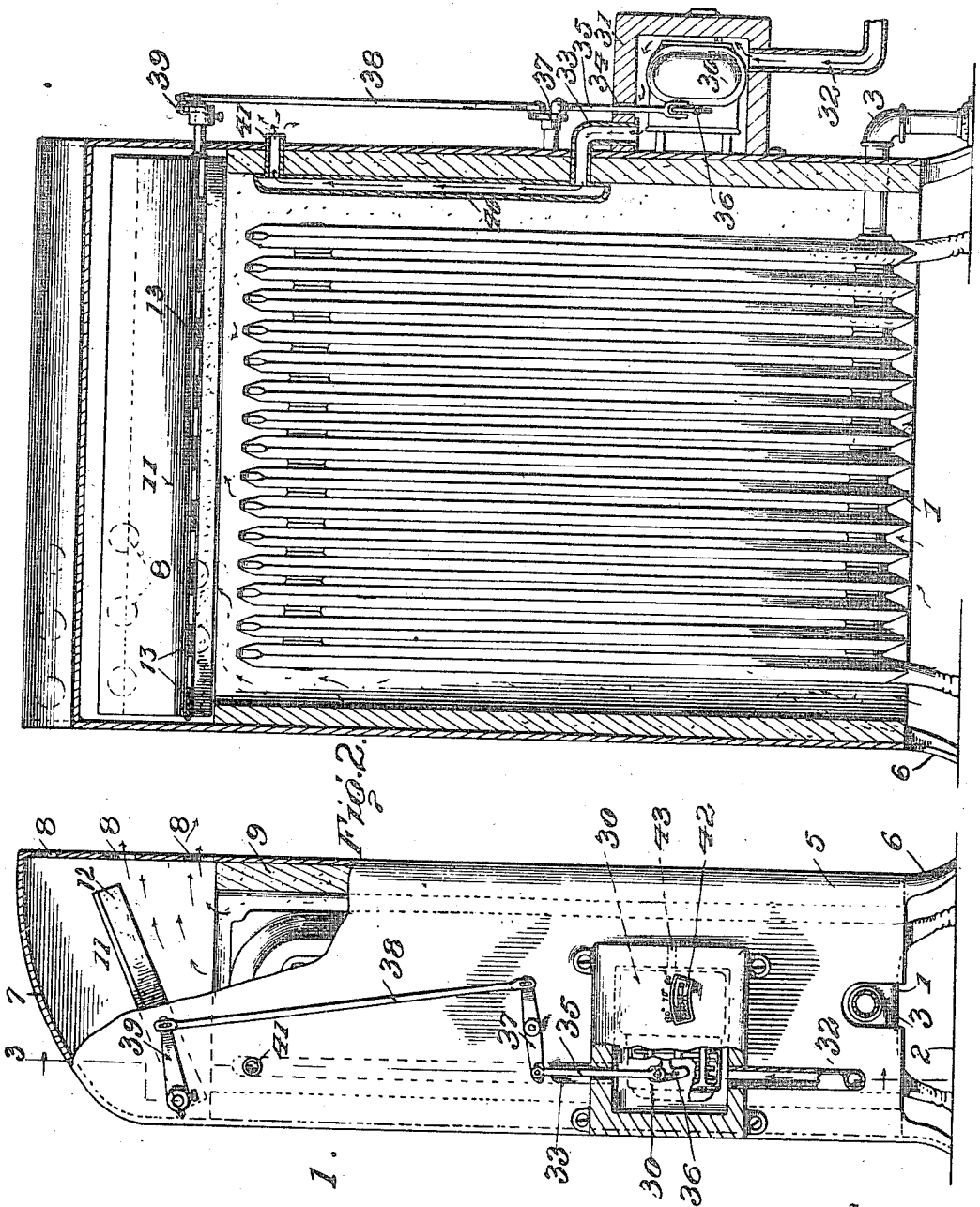

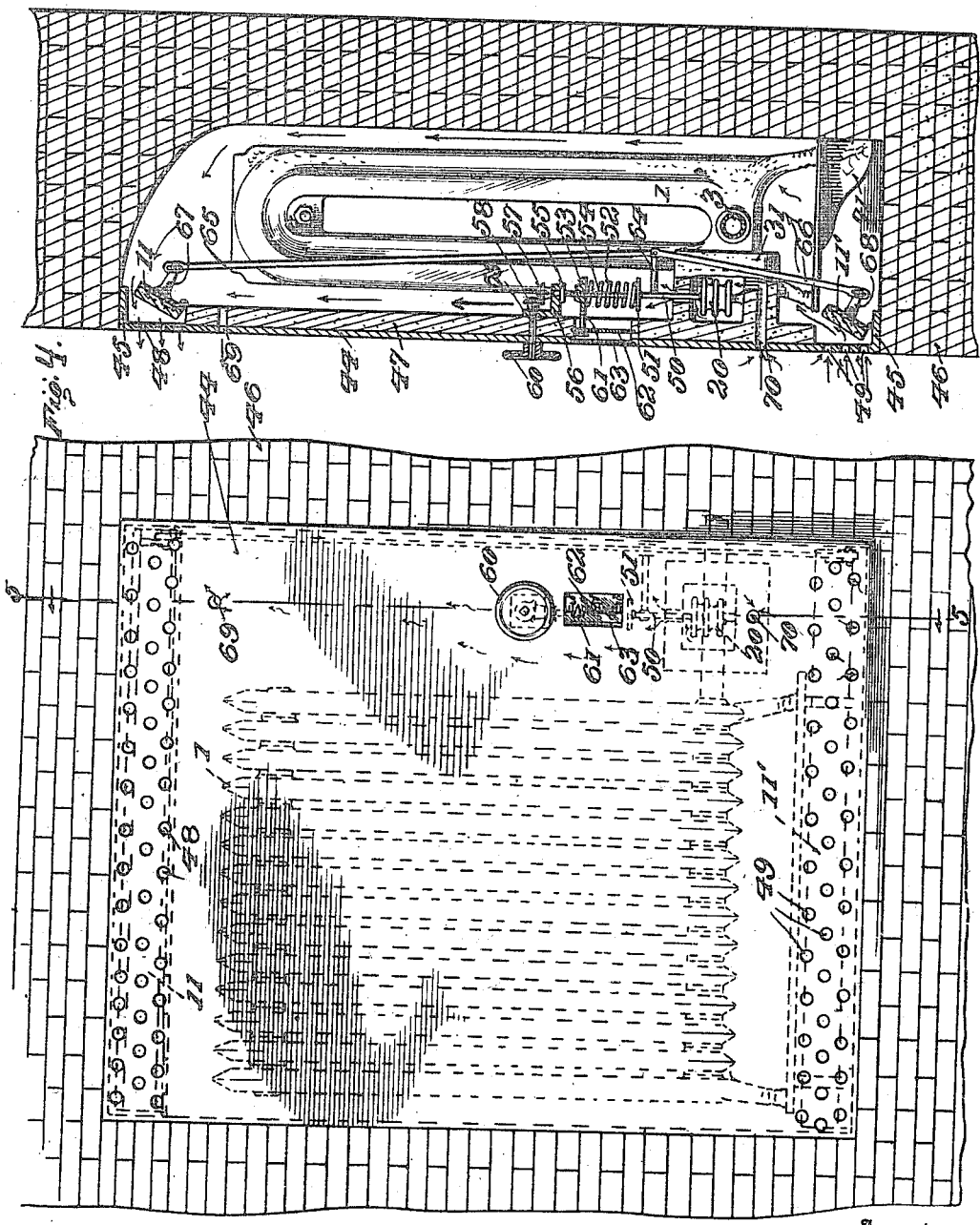

UNITED STATES PATENT OFFICE.

WESTON M. FULTON, OF KNOXVILLE, TENNESSEE, ASSIGNOR TO THE FULTON COMPANY, OF KNOXVILLE, TENNESSEE, A CORPORATION OF MAINE.

HEATING SYSTEM AND SYSTEM FOR TEMPERATURE REGULATION.

998,767.      Specification of Letters Patent.      Patented July 25, 1911.

Application filed April 21, 1909. Serial No. 491,303.

*To all whom it may concern:*

Be it known that I, WESTON M. FULTON, of Knoxville, Tennessee, have invented a new and useful Improvement in Heating Systems and Systems for Temperature Regulation, which invention is fully set forth in the following specification.

This invention relates to improvements in heating systems and systems for regulation of temperature, particularly when steam or hot water is used as the heating agent.

In steam and hot water heating systems there are three well-defined methods of exposing the radiators, giving rise to the designations "direct system", "direct-indirect" and "indirect". In the direct system, the radiator is directly exposed in the room and the air therein is heated by radiation and convection. In the direct-indirect system the radiator is arranged so that air from the outside will pass over the radiator before entering the room, and in the indirect system the heating coils are placed in a box or chamber open to the outside atmosphere and having flues leading to the rooms to be heated.

This invention relates more particularly to systems of heating, in which the radiator is inclosed in a casing through which air in the room is caused to circulate by convection, and to the regulation of the temperature of rooms so heated.

In steam and hot water heating systems in which radiators are employed, regulation of the temperature in the room heated by the radiator is generally effected by opening or closing the valve in the supply pipe to the radiator. This may be done by hand or by automatic means, such as by a thermostat placed in the room and controlling power means for operating the radiator valve. The regulation of the temperature by opening and closing the radiator valve does not afford as accurate control over the temperature of the room as is desirable. While the supply of heating fluid may be cut off from the radiator, there remains in the radiator a quantity of heated fluid, which, in cooling down, imparts its heat to the room, thereby causing the temperature of the room to rise for a time even after the valve is closed. Furthermore, the working parts of the admission valve become incrusted and often leak fluid into the radiator after the valve is closed, thereby interfering with the control of the temperature. In systems where automatic means are used for operating the radiator valve, some source of power must be employed which is under control of a thermostat. Usually compressed air is made the source of power. Its use involves the employment of delicate mechanism and adds to the cost of installation and maintenance.

The object of this invention is primarily to provide means associated with the radiator whereby the flow of the convectional air currents about the radiator may be controlled and the temperature of the room thereby regulated.

A further object is to provide a compact apparatus which can be easily and cheaply installed and which can be operated manually or automatically without expense, and which enables accurate and positive regulation of the temperature.

To effect the objects of this invention, I preferably provide a casing having a lining of heat lagging material and adapted to inclose the radiator on its sides, top and bottom, or the bottom may be left open. Openings are provided in the casing near or at the top and preferably located on the front side away from the wall against which the radiator is usually placed. Means are provided for controlling the flow of the convectional air currents through the casing, such as a valve or damper. One or more such dampers may be employed. One may be placed at the top of the casing and one at the bottom, or only one may be used. The valve or damper is operated either from outside the casing or on the inside and either by hand or automatic means subject to variations of the room temperature. In case my improvement is applied to a radiator exposed on all sides I prefer to employ a thermostat supported on the outside of the casing for controlling the movements of the valve or valves. The location of the means for operating the valves will be governed in a measure by the location of the radiator with respect to nearby objects.

It is sometimes desirable to have the radiator concealed in the wall for artistic reasons, in which case the wall itself may constitute a portion of the casing for the purpose of this invention.

Figure 1 is a view in side elevation with parts broken away, showing a variation of my improvement. Fig. 2 is a vertical longitudinal section on the line 3—3 of Fig. 1. Fig. 3 is an elevational view, and Fig. 4 a section thereof on the line 5—5 of Fig. 3, showing a further application of my improvement.

Referring to Figs. 1 and 2, there is therein shown a radiator 1 resting on floor 2 and having a heating fluid supply inlet 3 which is in free communication with a source of hot water or steam. A casing or housing 5 surrounds the radiator and is shown supported on suitable legs 6. The top of the casing is closed by a hood-portion 7 which acts to deflect the ascending air currents through openings 8 to the front or away from the room wall against which the radiator is intended to be placed. The casing is made of sheet metal such as iron and is preferably provided on the interior with a heat lagging lining 9 of non-conducting material, such as asbestos, which extends slightly beyond the top and bottom of the radiator leaving a space around the radiator for the flow of air. Circulation of air through the casing is controlled by a valve or damper 11 which extends the length of the radiator and is also provided with a non-heat conducting lining 12. While only one damper is here shown, and this one located at the top of the casing, two dampers may be employed as illustrated in Fig. 4 or the damper may be placed in any other position to control the flow of heated air. The damper 11 is revolubly supported by hinges 13 or in any suitable manner and is provided with a crank arm 39 which enables the damper to be turned by power applied thereto derived from a thermo-sensitive device such as indicated at 30 in Fig. 2.

With the view of protecting the thermo-sensitive device from undesirable stray cold air currents which might reach it by reason of its proximity to a window or door, I provide the thermo-sensitive device 30 with an inclosing casing 31 having walls of heat lagging material, such as asbestos or like material, and provide the same with an inlet pipe 32 and an outlet pipe 33. The thermo-sensitive device may be of any desired make, but the one I have illustrated diagrammatically in Figs. 2 and 3 and have described and claimed in my application Serial No. 484,273, filed March 18, 1909, is the one I prefer to use. The casing 31 is provided with an opening 34 through which a link 35 passes, the lower end of which is pivotally connected to the rock arm 36 of the thermo-sensitive device and the upper end of which connects by a lever 37, link 38, and crank arm 39, with the damper 11 to operate the same. Within the radiator-housing I provide an air heating chamber 40 which connects at its lower end through the wall of the housing with pipe 33. Its upper end opens into the room through a short pipe 41. The wall of chamber 40 which is exposed to the heat of the radiator is preferably of thin material having a high conductivity for heat, thereby enabling the air in chamber 40 to be readily heated. I have found copper a suitable material, though brass, iron, or other metal, may be used. Pipe 32 leads to some point in the room where the temperature of the room is normally that of the room as a whole. The casing 31 is provided with a glass-covered opening for observing the dial 42, and another opening 43 for inserting a key for setting the thermo-sensitive device to the desired temperature.

By reason of this construction the thermo-sensitive device 30 is enabled to respond to changes of temperature at any predetermined part of the room without being influenced by local cold air currents that may be present near the thermo-sensitive device. In operation the air whose temperature affects the thermo-sensitive device 30 in casing 31 is drawn into pipe 32 by the ascension in chamber 40 of the air which receives heat from the radiator 1. There is thus established a convectional flow of air about the thermo-sensitive device independent of local conditions in the immediate vicinity of the radiator. This circulation of air through chamber 31 is, however, insignificant in amount compared to the entire convectional circulation for heating the room flowing past the damper 11, and is not sufficient to materially affect the temperature of the room.

In Figs. 3 and 4 I have illustrated the application of my invention to a radiator located in a recess in the wall of the room. In this case I make use of the walls of the recess to form a part of the housing and provide a closure in form of a metal plate 44 having inwardly projecting flanges 45 fitting into the recess in the wall 46 and secured therein by screws or other means. The plate 44 is lined on the side next the radiator with heat lagging material 47 leaving the end portions of plate 44 uncovered. At the top and bottom of the plate are openings 48 and 49 respectively, through which air from the room enters at the bottom of the radiator and escapes at the top. 11, and 11' are heat lagged dampers operated by a collapsible and expansible vessel 20 containing a volatile liquid. This vessel is inclosed in a casing 31 through which air from outside the radiator housing is caused to circulate by convection. The movable end of the thermo-sensitive device 20 is provided with rod 50 terminating in a plate 51, against which a spring 52 is caused to press by means of a follow-block 53 mounted on a screw-threaded spindle 54 having an end thrust bearing shoulder 55 which bears against bracket arm 56, through which spindle 54 passes. The end of the spindle 54 extending through the bracket arm is provided with a bevel pinion 57 which meshes with a companion bevel pinion 58 on shaft 59 which is adapted to be turned by a hand wheel 60. The follow-block 53 is provided with an arm 61 extending to the front and provided with a pointer which moves over a scale 62 under a glass plate 63 which closes the opening in the plate 44. Extending from rod 50 is an arm 64 to the end of which damper-operating rods 65 and 66 are hinged. These rods engage lugs 67 and 68 on the dampers 11, 11', and transmit the movements of the thermo-sensitive device 20 to the latter. Just below the upper damper 11 is an air vent 69 above the inlet 70 leading to the casing 31 inclosing the thermo-sensitive device. The purpose of this vent is to permit escape of a small portion of the air heated by the radiator, thereby maintaining a convectional flow of air from the room around the thermo-sensitive device. This circulation of air is independent of that through the damper controlled openings and continues as long as heat is supplied to the radiator. I preferably provide brackets 71 for raising the radiator above the lower air inlets to secure better convectional effects. The bracket may however be omitted without material loss of convectional flow of the air past the radiator.

The operation of the device will be readily understood by reference to the drawing and above description. The thermo-sensitive device is set for maintaining the desired temperature in the room by turning hand wheel 60 till the pointer 61 reaches the point on the scale indicating the desired temperature. Movement of wheel 60 rotates the spindle 54 in the follow-block 53 which carries the pointer 61 and causes it to travel on its spindle. The pressure on the spring 52 is thereby varied and likewise the pressure on the vessel 20. At all temperatures below that for which the index hand or pointer 61 is set, the vessel 20 is collapsed sufficiently to open the dampers. As the temperature of the room rises due to the increased convectional circulation of air past the radiator, the air flowing continually around the vessel 20 gradually rises in temperature and expands the vapor therein, thereby gradually overcoming the tension of spring 54. When the temperature for which the pointer is set is reached, the dampers are closed preventing entrance of air to the radiator recess and escape of air therefrom. Meanwhile air is continually being circulated through chamber 31, as above explained, and keeps the vessel 20 responding to room temperature instead of the temperature of the recess containing the radiator, from which it is protected by means of the thick heat lagging wall of chamber 31.

It will, of course, be understood that the inventive idea involved is capable of receiving a variety of mechanical expressions and that the particular expression of the idea herein shown and described is merely used for illustration and that the claims are intended to cover all of the various mechanical embodiments of the idea of which it is capable.

I claim:—

1. A radiator attachment of the character described comprising a radiator casing, having an inlet for admitting air to be heated and an outlet for discharge of heated air, a damper for controlling the flow of air through said casing, a thermo-sensitive device for operating said damper, and an air conduit inclosing said device mounted on said casing through which circulation of air is effected independent of the circulation of air through said casing controlled by said damper.

2. A radiator attachment of the character described comprising a radiator casing, said casing having an inlet for admitting air to be heated and an outlet for discharging heated air, a damper located above the heating zone of said casing for controlling the discharge of heated air from the casing, a thermosensitive device outside said casing for operating said damper, and a conduit having an inlet and outlet outside said casing in which conduit is located said device, one portion of said conduit between its outlet and the thermo-sensitive device being located within said casing, circulation of air through said conduit being effected by difference of temperature in said casing and conduit.

In testimony whereof I have signed this specification in the presence of two subscribing witnesses.

WESTON M. FULTON.

Witnesses:
MARGARET COOMES,
E. J. HYATT.